(12) United States Patent
Klein (10) Patent No.: US 8,812,492 B2
(45) Date of Patent: Aug. 19, 2014

(54) AUTOMATIC AND DYNAMIC DESIGN OF CACHE GROUPS

(75) Inventor: Joachim Klein, Hochspeyer (DE)

(73) Assignee: Software AG, Darmstadt (DE)

( * ) Notice: Subject to any disclaimer, the term of this patent is extended or adjusted under 35 U.S.C. 154(b) by 377 days.

(21) Appl. No.: 13/330,860

(22) Filed: Dec. 20, 2011

(65) Prior Publication Data

US 2013/0159347 A1  Jun. 20, 2013

(51) Int. Cl.
    *G06F 17/30* (2006.01)
(52) U.S. Cl.
    USPC .......... 707/721; 707/723; 707/725; 707/737; 707/771; 707/797; 711/113; 711/118
(58) Field of Classification Search
    None
    See application file for complete search history.

(56) References Cited

U.S. PATENT DOCUMENTS

| | | | |
|---|---|---|---|
| 4,956,803 A * | 9/1990 | Tayler et al. | 711/113 |
| 5,822,749 A * | 10/1998 | Agarwal | 1/1 |
| 8,548,986 B2 * | 10/2013 | Surna et al. | 707/718 |
| 2006/0026154 A1 | 2/2006 | Altinel et al. | |
| 2006/0085601 A1 * | 4/2006 | Woffinden et al. | 711/133 |
| 2008/0033907 A1 * | 2/2008 | Woehler et al. | 707/2 |
| 2008/0215580 A1 * | 9/2008 | Altinel et al. | 707/5 |
| 2008/0222111 A1 * | 9/2008 | Hoang et al. | 707/3 |
| 2008/0222159 A1 * | 9/2008 | Aranha et al. | 707/10 |
| 2012/0263049 A1 * | 10/2012 | Venkatachalapathy et al. | 370/252 |

OTHER PUBLICATIONS

Harder et al., Query Processing in Constraint-Based Database Caches, University of Kaiserslautem, Germany, 2004, 44 pages.*
Harder et al., Database Caching-Towards a Cost Model for Pupolating Cache Groups, University of Kaiserslautem, Germany, 2004, 15 pages.*
Klein et al., Optimizing Maintenance of Constraint-Based Database Caches, University of Kaiserslautem, Germany, 2009, 16 pages.*
M. Altinel, C. Bornhövd, S. Krishnamurthy, C. Mohan, H. Pirahesh and B. Reinwald. Cache Tables: Paving the Way for an Adaptive Database Cache. In VLDB Conference, pp. 718-729, 2003. http://www.vldb.org/conf/2003/papers/S22P01.pdf.
Andreas Bühmann, Theo Härder and Christian Merker. A Middleware-based Approach to Database Caching. In ADBIS 2006, pp. 182-199, Thessaloniki 2006. http://wwwlgis.informatik.uni-kl.de/archiv/wwwdvs.informatik.uni-kl.de/pubs/papers/BHM06.ADBIS.pdf.
Theo Härder and Andreas Bühmann. Value Complete, Column, Complete, Predicate Complete Magic Words Driving the Design of Cache Groups. In VLDB Journal, pp. 805-826, 2007.
Oracle Corporation. TimesTen Database Documentation, 2011. http://download.oracle.com/docs/cd/E13085_01/doc/timesten.1121/e13073/define.htm.

* cited by examiner

*Primary Examiner* — Noosha Arjomandi
(74) *Attorney, Agent, or Firm* — Nixon & Vanderhye, P.C.

(57) ABSTRACT

A system and method is provided for automatic and dynamic adaptation of cache groups in a database system having one or more processors. The method includes analyzing a database query and determining if a set of predicates in a predicate pattern are suitable for inclusion in one or more cache groups, with the one or more cache groups having one or more cache tables; mapping value-based predicates in the predicate pattern to a filling column in the one or more cache tables; and mapping equi-join predicates in the predicate pattern to a referential cache constraint in the one or more cache tables. New cache groups can be created for predicate patterns occurring more frequently and existing cache groups can be deleted if the frequency of the predicate pattern falls below a predetermined threshold value.

15 Claims, 12 Drawing Sheets

CG1: single cache table | CG2: chain | CG3: homogeneous cycle | CG4: heterogeneous cycle

FIG. 7C anchored table set := {S,T,U}

Used equi-join predicated := {T.c = S.b}

$C_{SW}$ priority queue := [7, T.c → S.b]

FIG. 7D anchored table set := {S,T,U}

Used equi-join predicated := {T.c = S.b}

$C_{SW}$ priority queue := [7, T.c → S.b]

FIG. 8A anchored table set := {S,T,U}

Used equi-join predicated := {T.c = S.b, U.a = T.b}

$C_{SW}$ priority queue := [3, U.a → ,T.b, 7, T.c → S.b]

FIG. 8B anchored table set := {S,T,U}

Used equi-join predicated := {T.c = S.b, U.a = T.b}

$C_{SW}$ priority queue := [3, U.a ➡ ,T.b, 7, T.c ➡ S.b]

FIG. 8C anchored table set := {S,T,U,V}

Used equi-join predicated := {T.c = S.b, U.a = T.b, S.c = V.a}

$C_{SW}$ priority queue := [3, U.a ➡ ,T.b, 7, T.c ➡ S.b]
(remains unchanged)

FIG. 8D anchored table set := {S,T,U,V}

Used equi-join predicated := {T.c = S.b, U.a=T.b, S.c = V.a}

$C_{SW}$ priority queue := [3, U.a ➡ ,T.b, 7, T.c ➡ S.b]

FIG. 9A anchored table set := {S,T,U,V}

Used equi-join predicated := {T.c = S.b, U.a = T.b, S.c = V.a, V.a = U.c}

$C_{SW}$ priority queue := [3, U.a → ,T.b, 6, V.a → U.c, 7, T.c → S.b]

FIG. 9B anchored table set := {S,T,U,V}

Used equi-join predicated := {T.c = S.b, U.a = T.b, S.c = V.a, V.a = U.c}

$C_{SW}$ priority queue := [3, U.a → ,T.b, 6, V.a → U.c, 7, T.c → S.b]

FIG. 9C anchored table set := {S,T,U,V}

Used equi-join predicated := {T.c = S.b, U.a = T.b, S.c = V.a, V.a = U.c}

$C_{SW}$ priority queue := [ 6, V.a → U.c, 7, T.c → S.b]

```
function inferFederation(predicatePattern)
        inferredFederation = new empty CacheGroupFederation listOfValueBasedPredicates = searchValueBasedPredicates(predicatePattern)
        listOfEquiJoinPredicates = searchEquiJoinPredicates(predicatePattern)
        cwPriorityQueue = new empty priority Queue of [costValue, RCC]
        //reversed entries with low costs at head in cwPriorityQueue
        listOfAnchoredTables = new empty List of tables for each vbPredicate in listOfValueBasedPredicates
                inferredFederation.createCacheTable(getTable(vbPredicate))
                inferredFederation.markAsFCColumn(getColumn(vbPredicate))
                listOfAnchoredTables.add(getTable(vbPredicate))

while listOfEquiJoinPredicates is not empty
                listOfAddableRCCs = new empty List of RCCs
                listOfAddableRCCs = getAddableRCCs(listOfAnchoredTables)

mapOfCosts = new empty Map of RCC → costValue
                for each addableRCC in listOfAddableRCCs
                        mapOfCosts put (addableRCC →evalCosts(addableRCC))

rccMin = getRCCWithMinCosts(mapOfCosts)
                inferredFederation.createTableIfNotExists(getTargetTable(rccMin))
                listOfAnchoredTables.addIfNotExist(getTargetTable(rccMin))

inferredFederation.addRCC(rccMin)
                listOfEquiJoinPredicates.remove(getEquiJoinPredicateOf(rccMin))

if (listOfAddableRCCs.contains(reverseRCC(rccMin))
                        cwCosts = evalCosts(reverseRCC(rccMin) - evalCosts(rccMin)
                        cwPriorityQueue.add([cwCosts, rccMin])

while (inferredFederation.hasHeterogeneousCycle( ))
                        if (cwPriorityQueue.isEmpty( ))
                                return null
                        rccToSwitch = cwPriorityQueue.removeHead( ).getRCC( )
                        inferredFederation.removeRCC(rccToSwitch)
                        inferredFederation.addRCC(reverseRCC(rccToSwitch))

return inferredFederation
```

AUTOMATIC AND DYNAMIC DESIGN OF CACHE GROUPS

FIELD OF THE INVENTION

Certain example embodiments relate to systems and/or methods that include the automatic and dynamic design of cache groups in a database stored in a memory of a database system. In certain example embodiments, a query-centric approach (as opposed to a predicate-centric approach) is implemented, with the query-centric approach defining simple and clear rules and allowing the cache system to self-manage its cache groups.

BACKGROUND AND SUMMARY OF EXAMPLE EMBODIMENTS OF THE INVENTION

In the modern electronic world, information is propagated across many mediums. For instance, individuals can receive/send information using personal computers or even cell phones. Many times, information is sourced in one or more backend databases that store and propagate the information.

With the increasing demand of information bandwidth comes the need to improve the latency in receiving/sending information from/to the databases. One way to improve latency is by improving the memory access time for accessing data in the database. This can be accomplished through a database cache system.

CbDBC provides one approach to implementing a database cache. In general, a database cache system keeps subsets of data (e.g., from the backend) in a cache instance. The cache instances are located close to applications to avoid high latency if the backend is accessed without caching. One aspect of database caching involves providing for the execution of descriptive queries (e.g., SQL for CbDBC) at the cache without having to access the backend (e.g., the database system holding the complete data).

In order to achieve this, CbDBC uses cache groups to determine which values have to be stored value complete at the cache. The cache groups normally have a combination of referential cache constraints (RCC), filling columns (FC), and cache tables.

With the help of defined constraints (e.g., FCs and RCCs) within cache groups, the cache can easily determine which predicate extensions (e.g., all records necessary to evaluate the predicate) are completely available at the cache. This task is normally referred to as probing.

A cache group normally includes a root table that has exactly one cache key (CK) and a set of member tables that can be reached from the root table via RCCs. Using CKs can present some problems, however, if more than one CK is declared within a root table or within the cache group. FCs have been used to address this issue. With the help of FCs, it is possible to declare more than one start point for loading (e.g., many FCs) within a root table and, in addition, more cache groups can be federated.

Figure 1:
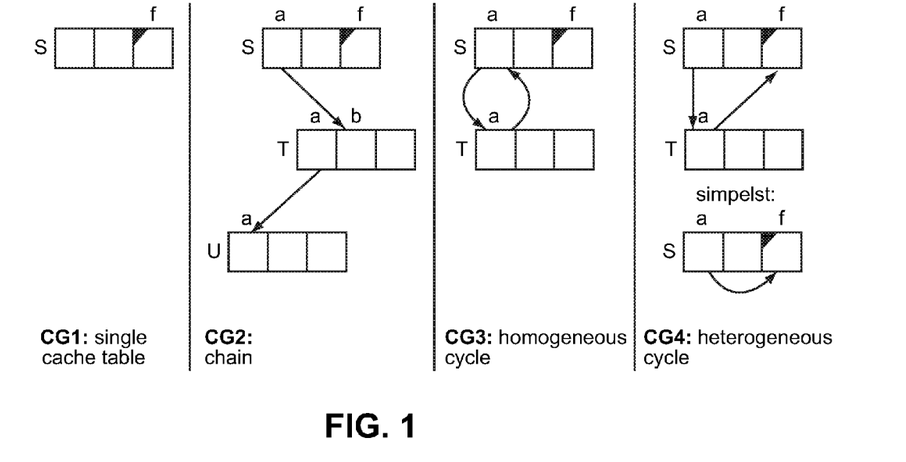
FIG. 1 is an example diagram showing certain cache group structures.

FIG. 1 shows some elementary cache group structures. Cache tables are denoted by capital letters (e.g., S, T, and U), and columns are denoted by lowercase letters (e.g., a, b, and c). Each cache table S belongs to one backend tables $S_B$ and is able to store records of $S_B$. The arrows are RCCs and the boxes with black triangles denote FCs.

FIG. 1 shows a design having cache group structures that may be considered relatively difficult to maintain. That is, cache group 4 (CG4) of FIG. 1 shows a heterogeneous cycle where more than one column in a cache table belongs to the cycle. In addition, there are some situations where one design may be deemed preferable to another. Thus, a designer may have to decide which cache groups to build and how to build it.

Currently, the design and creation of cache groups is a manual task that requires a database administrator to build the groups. There is no known system that allows an automatic creation of cache groups to react immediately and dynamically on workload shifts. Instead, the shifts need to be identified manually and, after that, the administrator has to decide which predicates (e.g., cache groups/cache group federations) need to be adapted, which ones need to be deleted, and which new cache groups should be created.

There are currently no design rules for automatically building cache groups. There is only the basic knowledge that a cache group is built for predicates that are often used or, at an even higher level, the defined cache groups must be beneficial for caching. Consequently, the time spent maintaining the cache groups offsets the benefits gained through the improved latency of the cache groups.

Thus, it will be appreciated that there is a need for techniques that automatically and dynamically change cache group structures based on predefined design rules.

In certain example embodiments, a method for automatic and dynamic adaptation of cache groups in a database system having one or more processors comprises analyzing a database query and determining if a set of predicates in a predicate pattern are suitable for inclusion in one or more cache groups, the one or more cache groups having one or more cache tables, mapping value-based predicates in the predicate pattern to a filling column in the one or more cache tables, and mapping equi-join predicates in the predicate pattern to a referential cache constraint in the one or more cache tables, wherein new cache groups are created for predicate patterns occurring more frequently and existing cache groups are deleted if the frequency of the predicate pattern falls below a predetermined threshold value.

In a non-limiting, example implementation the frequency relates to a logical time in which the predicate patterns are occurring.

In another non-limiting, example implementation cache groups are federated when the cache groups belong to a same predicate pattern.

In yet another non-limiting, example implementation cache groups are prohibited from further federation when the cache groups belong to a different predicate pattern.

In certain example embodiments, there is provided a method for automatic and dynamic adaptation of cache groups in a database system having one or more processors. The method comprises creating an anchored table set configured to hold one or more cache tables, collecting value-based predicates in a database query, creating a cache table for each value-based predicate and marking a filling column in each respective cache table, adding each cache table to the anchored table set, determining addable referential cache constraints between each cache table in the anchored table set, determining costs for each addable referential cache constraint, adding the referential cache constraint based on the determined cost of the respective referential cache constraint, checking the cache tables in the anchored table set for heterogeneous cycles between tables, and modifying referential cache constraints between cache tables when a heterogeneous cycle exists between cache tables, wherein the determining addable referential cache constraints, the determining costs for each addable referential cache constraint, the adding the referential cache constraint, the checking the cache tables in the anchored table set, and the modifying the referential cache constraints is repeated until all possible addable referential cache constraints have been exhausted.

In certain example embodiments, there is provided a non-transitory computer-readable storage medium having computer readable code embodied therein and capable of being stored in a memory as computer program instructions that, when executed by a computer having one or more processors, causes the computer to execute the methods described in the preceding paragraphs.

In certain example embodiments, there is provided a database System having a backend database having a memory and one or more processors and storing backend data, and one or more cache instances having a memory and one or more processors and operatively communicating with the backend database. The one or more processors in the one or more cache instances are configured to create an anchored table set configured to hold one or more cache tables, collect value-based predicates in a database query, create a cache table for each value-based predicate and marking a filling column in each respective cache table, add each cache table to the anchored table set, determine addable referential cache constraints between each cache table in the anchored table set, determine costs for each addable referential cache constraint, add the referential cache constraint based on the determined cost of the respective referential cache constraint, check the cache tables in the anchored table set for heterogeneous cycles between tables, and modify referential cache constraints between cache tables when a heterogeneous cycle exists between cache tables, wherein the determining addable referential cache constraints, the determining costs for each addable referential cache constraint, the adding the referential cache constraint, the checking the cache tables in the anchored table set, and the modifying the referential cache constraints is repeated until all possible addable referential cache constraints have been exhausted.

In a non-limiting, example implementation a referential cache constraint having a minimal cost amongst each addable referential cache constraint is determined.

In another non-limiting, example implementation a cost for a reverse of each addable referential cache constraint is calculated.

In yet another non-limiting, example implementation a switching cost is calculated for each addable referential cache constraint and its corresponding cost for the reverse of each addable referential cache constraint by subtracting the cost of each addable referential cache constraint from its corresponding cost for the reverse of each addable referential cache constraint.

In another non-limiting, example implementation the switching cost for each addable referential cache constraint is added to a priority list where the smaller switching costs have higher priority.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 11 shows an example implementation using pseudocode; and

DETAILED DESCRIPTION OF EXAMPLE EMBODIMENTS OF THE INVENTION

In the following description, for purposes of explanation and non-limitation, specific details are set forth, such as particular nodes, functional entities, techniques, protocols, etc., in order to provide an understanding of the described technology. It will be apparent to one skilled in the art that other embodiments may be practiced apart from the specific details described below. In other instances, detailed descriptions of well-known methods, devices, techniques, etc., are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on non-transitory computer-readable storage medium and when the instructions are executed by a computer or other suitable processor control, the computer or processor performs the functions. Although databases may be depicted as tables below, other formats (including relational databases, object-based models and/or distributed databases) may be used to store and manipulate data.

Although process steps, algorithms, and the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., a processor and those input devices and output devices that are appropriate to perform the process.

Various forms of computer readable media may be involved in carrying data (e.g., sequences of instructions) to a processor. For example, data may be (i) delivered from RAM to a processor; (ii) carried over any type of transmission medium (e.g., wire, wireless, optical, etc.); and/or (iii) formatted and/or transmitted according to numerous formats, standards or protocols, in any of a variety of ways well known in the art.

The technology described herein implements the automatic and dynamic creation of cache groups using a query-centric approach (as opposed to a predicate-centric approach). The query-centric approach defines simple and clear rules and allows a cache system to self-manage its cache groups.

By using the query-centric approach, the incoming workload is given by the queries that are executed over a cache instance. Each query can contain multiple predicates that could be supported by a cache group. The query-centric approach observes the whole query and tries to create exactly one cache group federation that is able to support the predicate pattern of the complete query.

In general, a cache group can support multiple queries. Whether a query can be answered by the cache depends at least in part on the cache group content. The cache group definition itself supports just a set of predicate patterns. A predicate pattern for an example query predicate is P=(S.a=5 AND S.b=T.c) and can be supported by a cache group using the query predicate PatP=(S.a=? AND S.b=T.c). Value based predicates such as (S.a=5) are changed to replace "5" with a "?" and equi-join predicates (e.g., S.b=T.c) remain unchanged. The definition of a cache group is based on the predicate pattern derived from the query predicate given by the SQL where clause, at least implying that the concrete values are not observed to build a cache group or a cache group federation.

The CbDBC approach mainly supports predicate-selection-join queries (PSJ queries) that include value-based predicates and equi-join predicates. Value-based predicates are mapped to a FC, and equi-join predicates are mapped to an RCC. In some cases, value-based predicates can be mapped by RCCs using another column as an FC of the cache group. It is also possible that the column is implicitly value complete because it refers to a unique column and, hence, did not need to be an FC in special cases.

Figure 2:
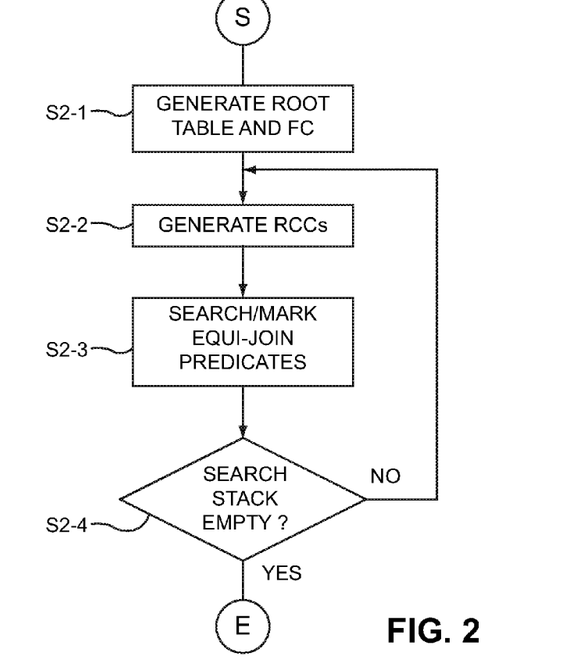
FIG. 2 shows an example application flowchart for a basic cache group inference.

FIG. 2 shows an example application flowchart for a basic cache group inference. The system begins in step S2-1 where the root table is generated and an FC is marked. Upon generating the root table and FC, the system proceeds to step S2-2 where RCCs are generated. After generating the RCCs, the system proceeds to step S2-3 where equi-join predicates are searched and subsequently marked as processed. The system then proceeds to step S2-4 where it determines if the search stack is empty, and if not, the system repeats steps S2-2 to S2-4 until the search stack is depleted. The processes shown in FIG. 2 are further described through examples provided below.

Figure 3:
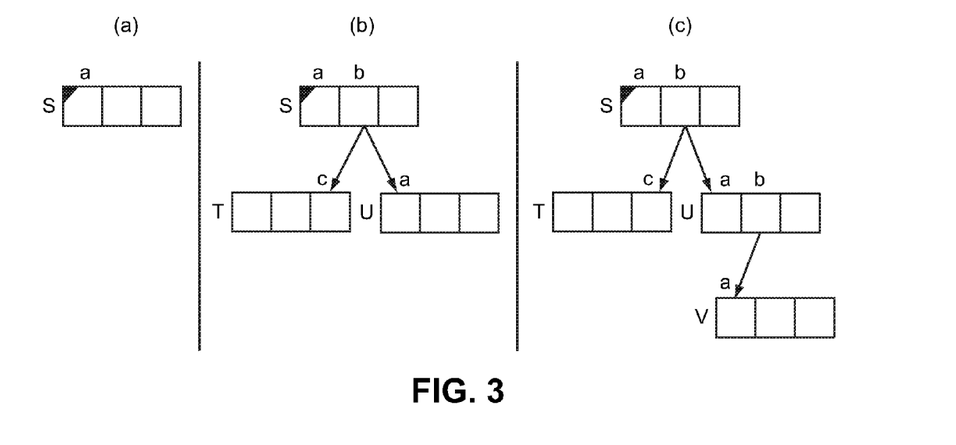
FIGS. 3a-c show diagrams of cache groups used for a basic cache group inference.

FIGS. 3a-c show diagrams of cache groups used for a basic cache group inference. An example predicate pattern of a query shown in FIGS. 3a-c is Pat=(S.a=? AND S.b=T.c AND S.b=U.a AND U.b=V.a). The first step is generating a root table and an FC. As soon as a value-based predicate (here S.a=?) is found, the corresponding cache table is built as the root table (here S) of the cache group, and the column S.a is marked/defined as an FC.

The table S is put in a stack of tables, and the stack is referred to as search stack because the system searches for equi-join predicates that refer to tables popped from that stack. In addition, the value-based predicate S.a=? is marked as used/processed. FIG. 3a shows the situation where the table S is marked with the FC in column a.

After generating the root table and the filling column, the system generates RCCs between cache tables because a cache group in general has only one FC. A table is then popped from the search list (table S), and equi-join predicates are subsequently searched. Using the example of table S, equi-join predicates S.b=T.c and S.b=U.a are found.

As can be seen in FIG. 3b, an RCC is created for each equi-join predicate. The search table column of the found predicate is the source column, and the join partner is the target column. In this example, the RCCs S.b→T.c and S.b→U.a are created at start. The cache tables of the RCC target columns are created if they do not already exist. After that, the tables of the RCC target columns are pushed to the search stack and the predicates (here S.b=T.c and S.b=U.a) are marked as used.

After generating the RCCs, the search for further equi-join predicates is recursively continued until the search stack is empty. In the example mentioned above, the equi-join predicate U.b=V.a is left. The RCC U.b→V.a is added as soon as U is processed and the predicate is marked as used and V is added to the search stack. Because no more equi-join predicates are left, the processing stops after processing T and V. The final, inferred cache group is shown in FIG. 3c.

Figure 4:
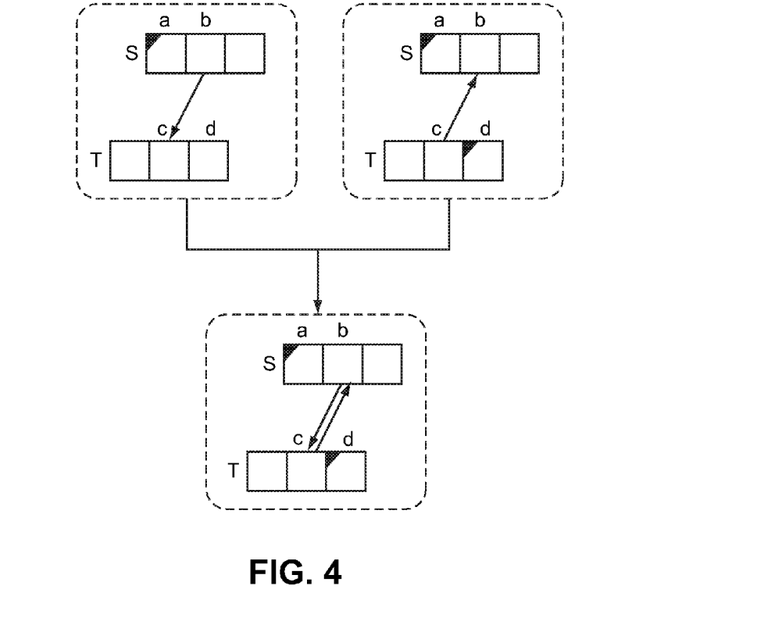
FIG. 4 shows a diagram where a predicate pattern may have more than one value-based predicate.

FIG. 4 shows a situation where a predicate pattern may have more than one value-based predicate. If a predicate pattern has more than one value-based predicate, multiple cache groups may need to be built to preserve all predicates. To achieve this, the basic inference mechanism can be used to build a cache group for each value-based predicate in the predicate pattern.

For the pattern Pat=(S.a=? AND S.b=T.c AND T.d=?), two cache groups are obtained, as shown in FIG. 4. To keep these two cache groups separated in the cache may be considered inefficient. Even if the cache is able to avoid redundant records physically, it nonetheless may have to execute an internal join between the two cache groups to evaluate queries with the predicate pattern Pat. As can be seen in FIG. 4, the two RCCs S.b→T.c and T.c→S.b are redundant. Accordingly, one of the RCCs can be dropped.

Figure 5A:
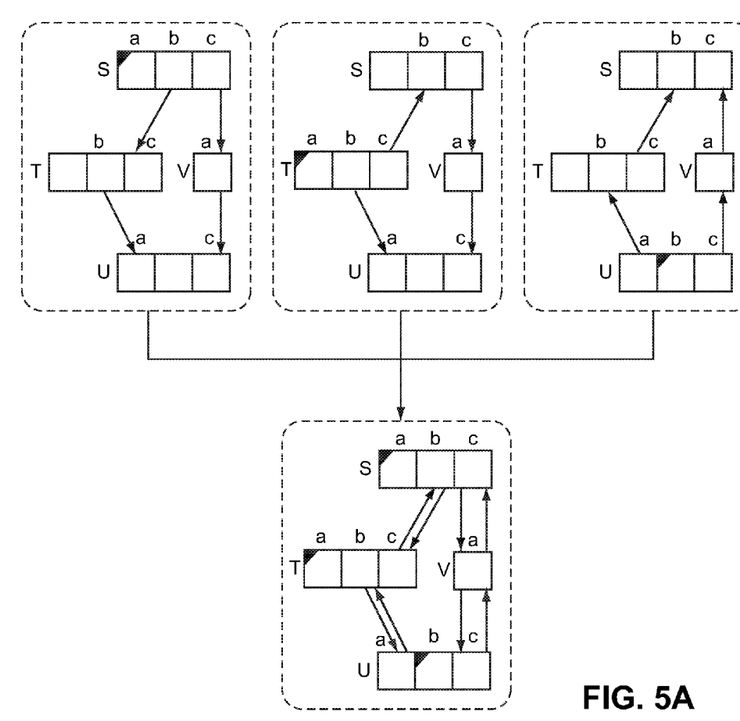
FIGS. 5a-c show diagrams of certain cache group designs.

FIG. 5a shows a more complex example for the query pattern Pat=(S.a=?AND T.a=? AND U.b=? AND S.b=T.c AND T.b=U.a AND S.c=V.a AND V.a=U.c). The federation in this example not only includes redundant RCCs, but also includes many heterogeneous cycles.

Figure 5B:
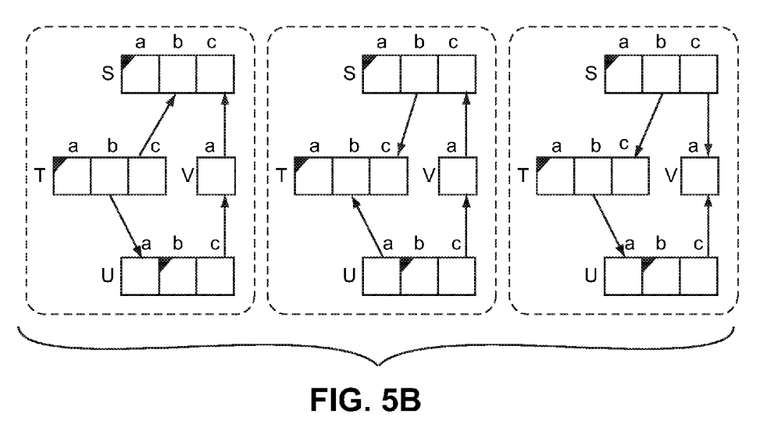

As can be seen in FIG. 5a, there are many redundant RCCs that can be removed, and there are many possibilities to reach a federation with a reduced (or minimal) count of RCCs that covers all predicates in Pat. FIG. 5b shows an example of correct and minimal federations for Pat. As described further below, each RCC can be selected via a cost calculation scheme.

Figure 5C:
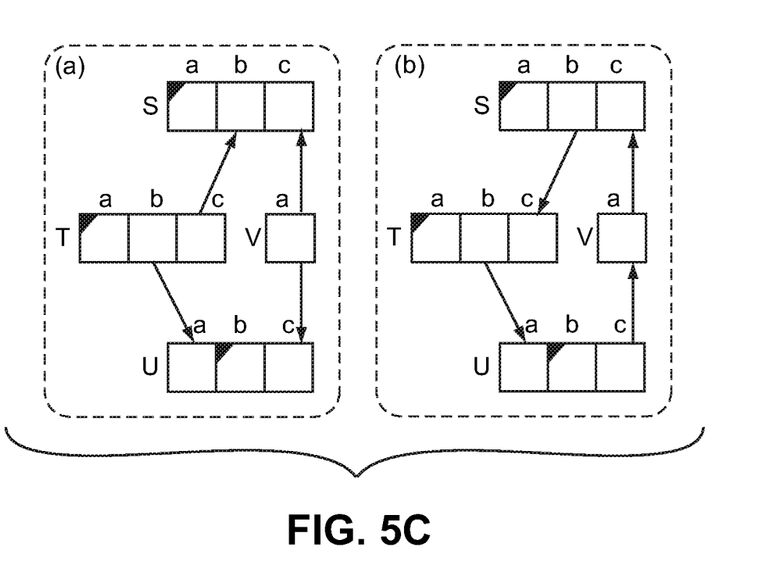

FIG. 5c shows a situation where the federation is invalid, and FIG. 5d shows a situation where the federation includes a heterogeneous cycle. The federation in FIG. 5c is invalid because V has no incoming RCCs and no FC. Thus, V is not reached, never loaded and, hence, not useable. In addition, Pat is not covered by this federation.

As discussed above, one way to avoid bad federations is to generate the cache groups step-by-step (e.g., the basic cache group inference) and federate them as soon as all predicates within the query pattern are mapped once to a cache group.

Also, the choice of RCCs can be prioritized based on costs (e.g., cost estimations for the loading effort along RCCs) to find an optimized solution.

Figure 6:
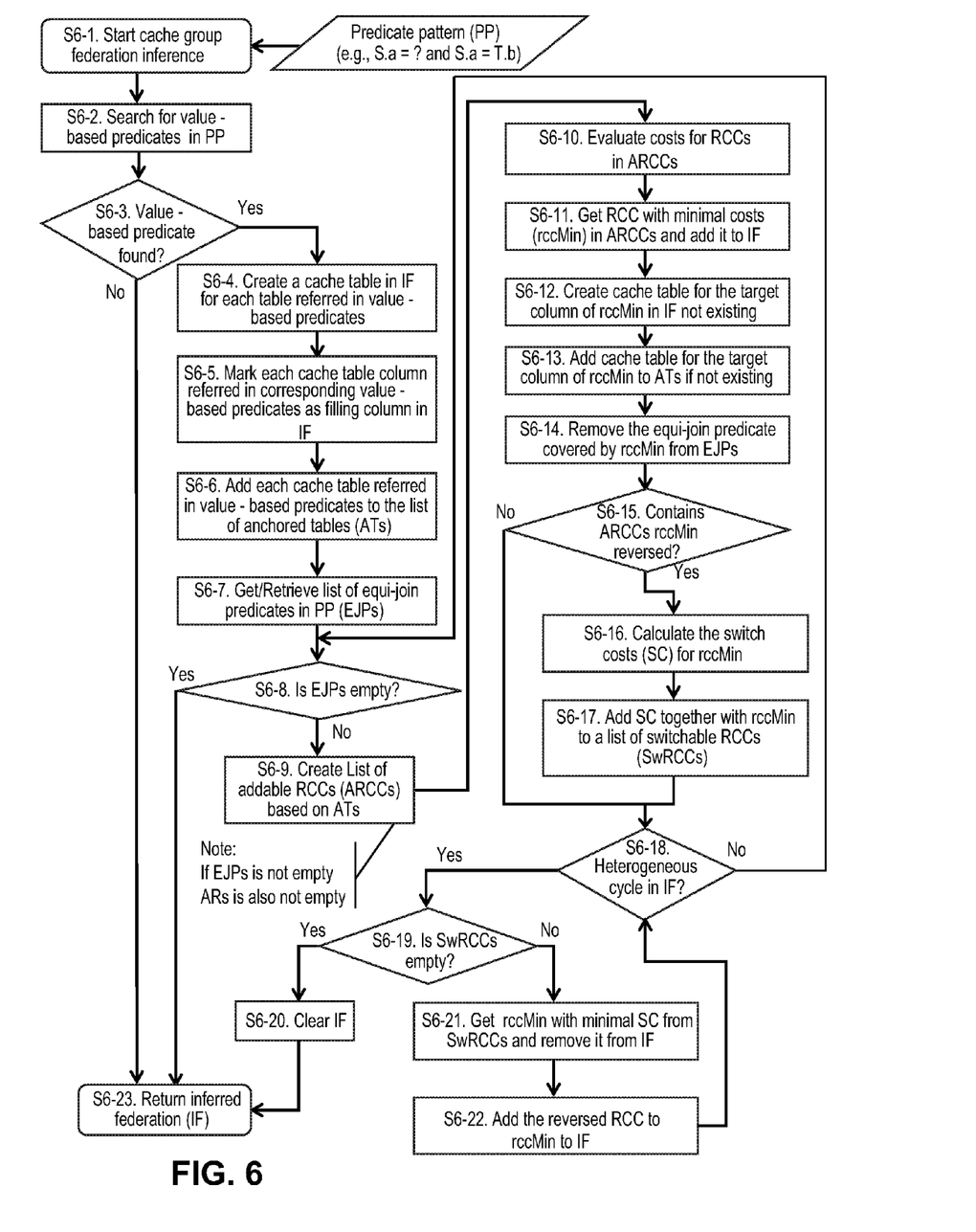
FIG. 6 depicts an example application flowchart for a cache group federation inference.

FIG. 6 shows an application flowchart for a cache group federation inference. Starting with a predicate pattern (PP) (e.g, S.a=? and S.a=T.b), the system begins in step S6-1, where a cache group federation inference is started. The system then proceeds to step S6-2, where value-based predicates in the predicate pattern are searched.

In step S6-3, if no value-based predicate is found, the system jumps to step S6-23, where the inferred federation is returned (e.g., an empty federation in this case and, hence, the cache system cannot support such a query pattern). If a value-based predicate is found, the system proceeds to step S6-4, where a cache table in the inferred federation is created for each table referred in value-based predicates. In step S6-5, each cache table column referred in found value-based predicates is marked as a filling column and the corresponding cache table is added to the list of anchored tables in step S6-6.

After the cache table is added, the system proceeds to step S6-7, where the list of equi-join predicates are retrieved. If the equi-join predicate list is empty (step S6-8), the system proceeds to step S6-23 where the inferred federation is returned. If the list is not empty, the system proceeds to step S6-9, where a list of addable RCCs are created based on the anchored tables. It should be noted that if the list of equi-join predicates is not empty, the list of addable RCCs is also not empty.

After creating the list of RCCs, the system proceeds to step S6-10, where costs are evaluated for RCCs. Upon evaluating costs, an RCC with minimal costs (rccMin) is retrieved and added to the inferred federation (step S6-11). After retrieving an RCC with minimal costs, a cache table is created (step S6-12) for the target column of rccMin and the cache table is added to the anchored tables if it currently does not exist among the anchored tables (step S6-13). The equi-join predicates covered by rccMin from the list of equi-join predicates are removed (step S6-14).

In step S6-15, the system determines if the addable RCC rccMin can be reversed and, if so, the switch costs (SC) for rccMin is calculated (step S6-16) and the SC is added together with rccMin to a list of switchable RCCs (SwRCCs) (step S6-17). If the RCC cannot be reversed, the system proceeds to step S6-18, where it looks to see if a heterogeneous cycle is in the current inferred federation.

If there is no heterogeneous cycle, the system jumps back to step S6-8, where it repeats the above-processes until the equi-join predicate list is empty. If a heterogeneous cycle exists, the system determines if the list of switchable RCCs is empty (step S6-19). If the list is empty, the inferred federation is cleared (step S6-20) and returned (step S6-23). If the list is not empty, the rccMin with minimal switching cost is retrieved from the list and removed from the inferred federation (step S6-21). The reversed RCC is added to rccMin to the inferred federation (step S6-22), and the system again determine if there is a heterogeneous cycle in the inferred federation (step S6-18). The processes shown in FIG. 6 are described relative to an example predicate pattern as discussed below.

Figure 7A:
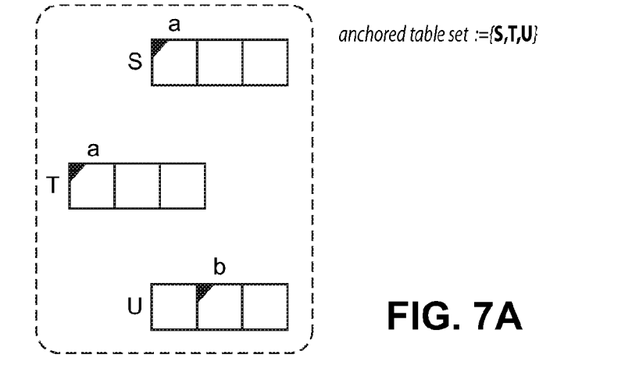
FIGS. 7a-d show diagrams of an example cache group federation inference.

FIG. 7a shows three FCs and the corresponding generated cache tables. Using the example predicate pattern from above, Pat=(S.a=?AND T.a=? AND U.b=? AND S.b=T.c AND T.b=U.a AND S.c=V.a AND V.a=U.c), a set of tables is maintained. The tables added to the set are denoted as anchored tables and are a part of the anchored table set. An anchored table is a cache table that can be used (or rather the columns of these tables) as source for RCCs.

With the cache group federation inference, the system begins by collecting all value-based predicates (e.g., S.a=?, T.a=?, and U.b=?). For these predicates, a cache table is created and the referred column is marked as FC. The created tables are added to the anchored table set. If no value-based predicates are found, the processing stops, and no cache group federation is created.

After collecting all the value-based predicates, the system then searches for RCCs that can be created/added. Columns of an anchored table can be used as source columns of RCCs. Thus, equi-join predicates referring to those columns are searched for and equi-join predicates marked as used are not considered.

Using the example for FIG. 7a, the predicates S.b=T.c and S.c=V.a are found for the cache table S, S.b=T.c and T.b=U.a for T, and T.b=U.a and V.a=U.c for U, because no equi-join predicates are currently excluded. Similar to the basic algorithm for cache groups, the respective join partner of an equi-join predicate is used as RCC target column. This is, for example, the column T c of the predicate S.b=T.c, if the anchored table S is currently searched. Hence, regarding S and S.b=T.c, the RCC S.b→T.c is addable and, therefore, added to the set of addable RCCs. If T and S.b=T.c is currently processed, the RCC T.c→S.b is added. After searching each anchored table the list of addable RCCs is complete.

Figure 7B:
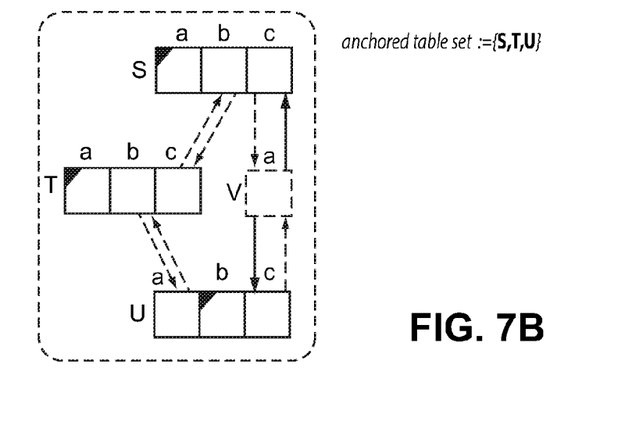

FIG. 7b shows the set of addable RCCs using dashed arrows. The RCCs V.a→S.c and V.a→U.s are not added (or rather addable) because V is not currently anchored.

Figure 7C:
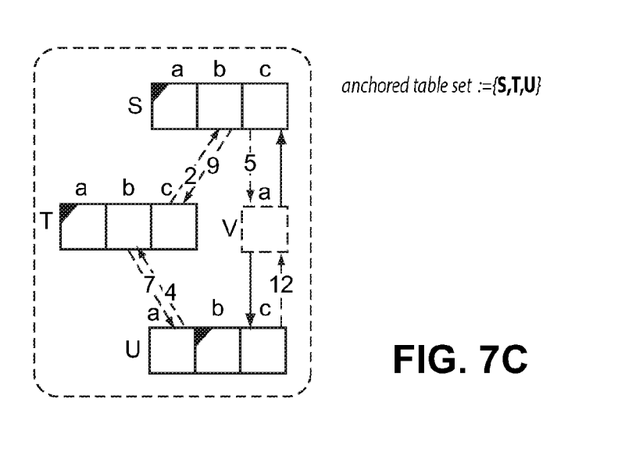

After finding the addable RCCs, the system assigns cost to each RCC as shown in FIG. 7c. Cost calculation is not bound to any particular algorithm or scheme and can be adapted to reach specific goals. As can be seen in FIG. 7c, for example C(S.b→T.c)=9 and C(T.c→S.b)=2.

After assigning costs to the RCCs, the RCC with currently minimal costs (denoted as Rmin) is added to the federation, and the corresponding equi-join predicate covered by the added RCC is marked and used. The table of the RCC target column is created if it does not exist in the currently generated partial federation. If a new cache table must be created, the table of the RCC target column is added to the set of anchored tables.

Using the example shown in FIG. 7c, at the beginning Rmin=T.c→S.b. Because S is already created, the set of generated cache tables is not changed, and the set of anchored tables remains unchanged. If the reversed RCC of Rmin (denoted as Rrev, here S.b→T.c) is currently included in the list of addable RCCs, switching costs (Csw) are calculated for it. These are the costs that have to be added if the RCC Rmin needs to be reversed to solve a heterogeneous cycle. Csw is calculated as Csw=C(Rrev)−C(Rmin). For the first time in this example, where Rmin=T.c→S.b and Rrev=S.b→T.c, Csw=C(S.b→T.c)−C(T.c→S.b)=9−2=7. The calculated switching costs are added to a priority list (e.g., with smaller costs having the highest priority) together with the RCC that can be reversed for these costs (e.g., the currently added RCC Rmin). Hence, the element (7, T.c→S.b) is added at start, and the intermediate state of this example is shown in FIG. 7d.

After assigning costs and determining the most cost efficient RCCs, the system then checks the currently generated cache group for heterogeneous cycles. This check can be performed by a simple graph algorithm (e.g., depth first search, breath first search, or the like), for example, if cache tables are considered as nodes and RCCs as edges of a directed graph. If the path of the cycle includes more than one column per table (or node), the cycle is heterogeneous. If a heterogeneous cycle is detected, the RCC at the head of the Csw priority queue is switched, and the corresponding Csw entry is removed. The system continues to check for heterogeneous cycles and if entries in the Csw priority queue run out, the processing stops and the created federation is rejected thus ensuring that a federation is never created with a heterogeneous cycle. Similarly, the system continues to process until all equi-join predicates are marked as used.

Figure 7D:
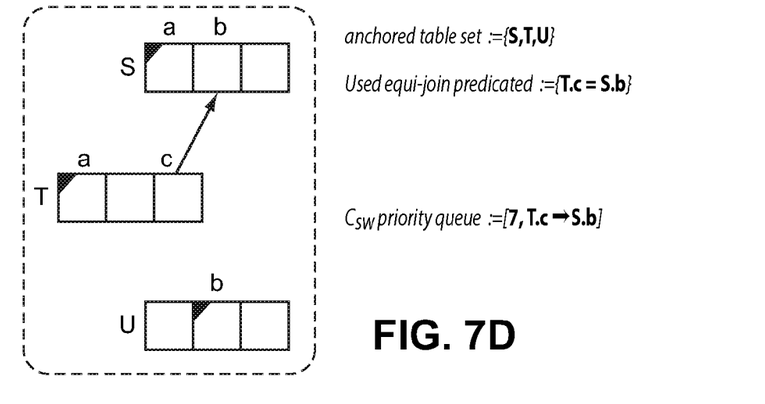

Using the example from the state shown in FIG. 7d, the equi-join predicate S.b=T.c is marked as used. The addable RCCs are now shown in FIG. 8a. Based on the annotated costs, the RCC U.a→T.b is added next. The reversed RCC T.b→U.a is a member of addable RCCs so that (3, U.a→T.b) is added to the priority queue of switchable RCCs. Based on the costs, the RCC S.c→V.a is added. Hence, V is now anchored. The reversed RCC V.a→S.c is not included in the set of addable RCCs and, hence, the priority queue remains unchanged. This scheme prevents the creation of wrong federations as shown previously. The progression of adding RCCs and assigning costs is shown in FIGS. 8a-8d.

Figure 8A:
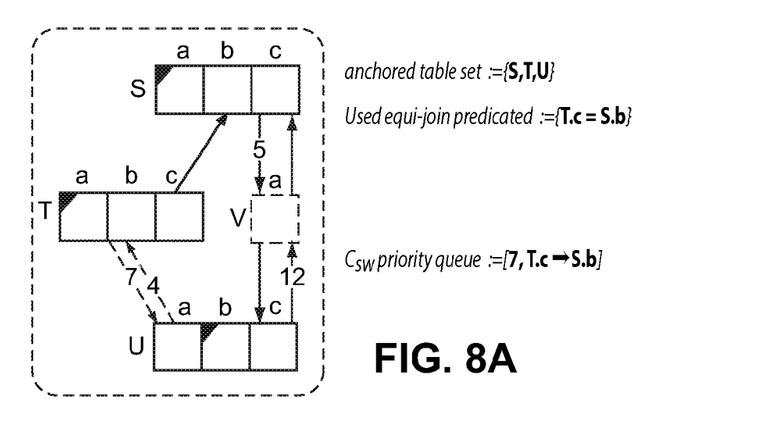
FIGS. 8a-d show example diagrams of cache groups adding referential cache constraints and assigning costs to the constrains.
Figure 8B:
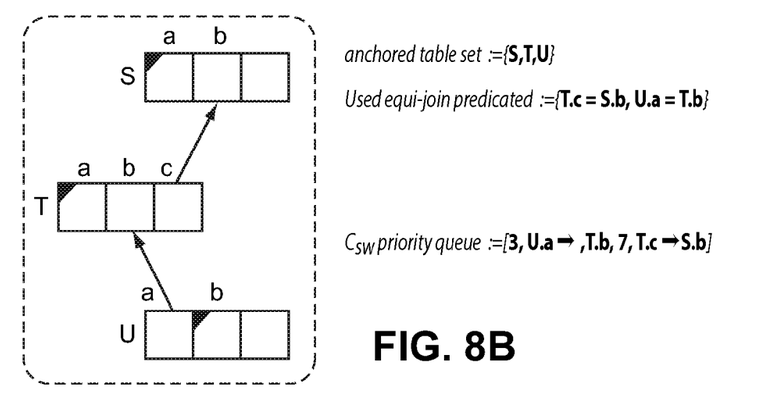
Figure 8C:
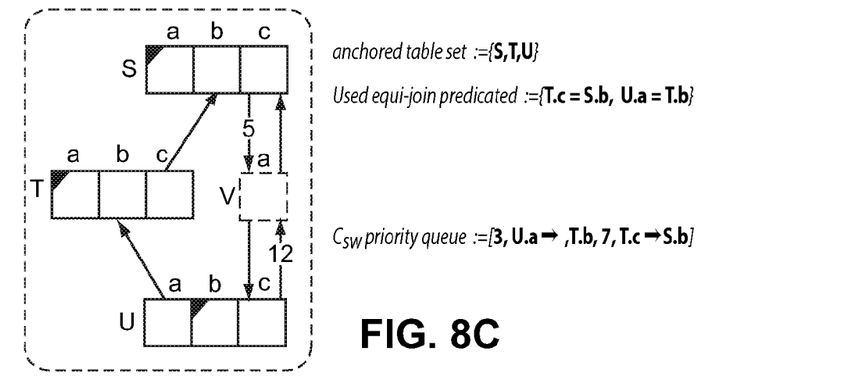
Figure 8D:
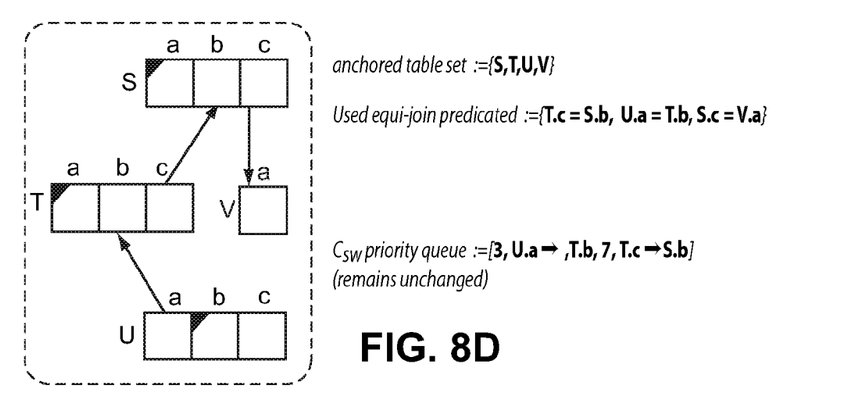
Figure 9A:
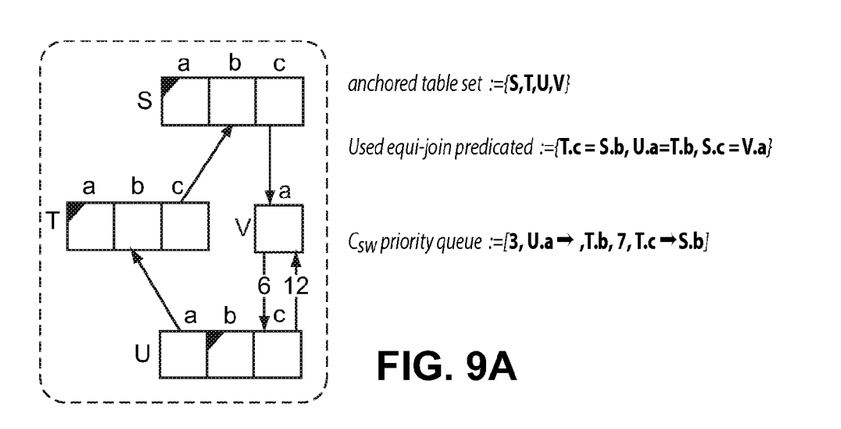
FIGS. 9a-d show example diagrams of cache groups where heterogeneous cycles are checked.
Figure 9B:
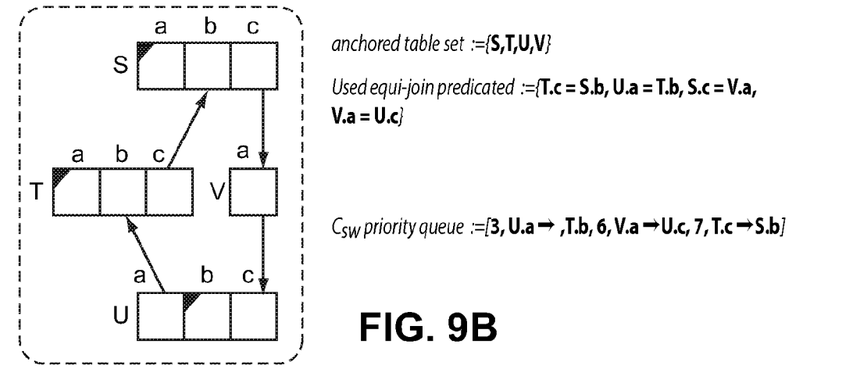
Figure 9C:
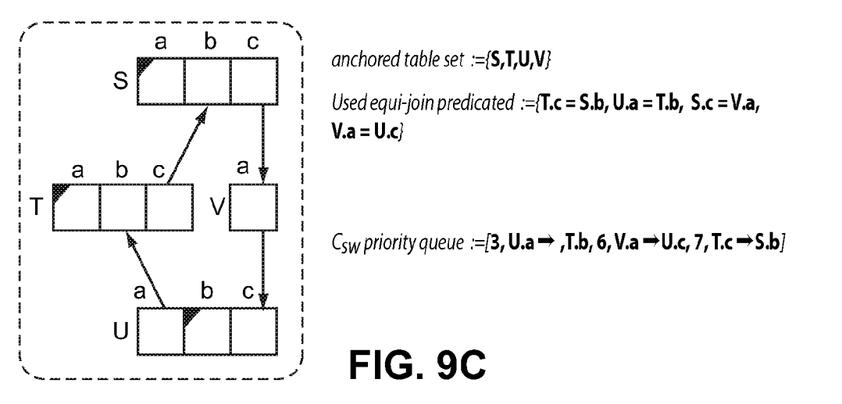
Figure 9D:
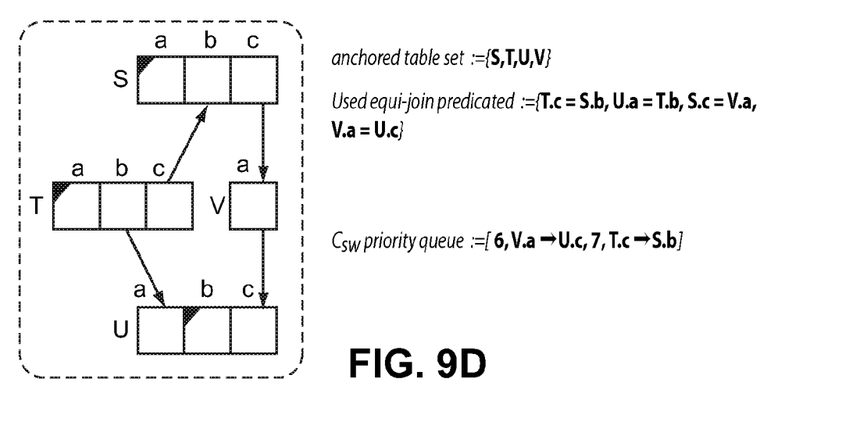

In FIG. 8d, only the predicate V.a=U.c is left. Because V is now anchored, both RCCs V.a→U.c and U.c→V.a can be added. FIG. 9a shows the cost estimation votes for RCC V.a→U.c. The priority list is adapted by adding (6, V.a→U.c) and following a check for heterogeneous cycles, an RCC will need to be switched. FIGS. 9a-d show the progression where the heterogeneous cycles are checked and rectified in FIG. 9d. In FIG. 9d, all equi-join predicates are used and the final generated federation is shown.

Figure 10:
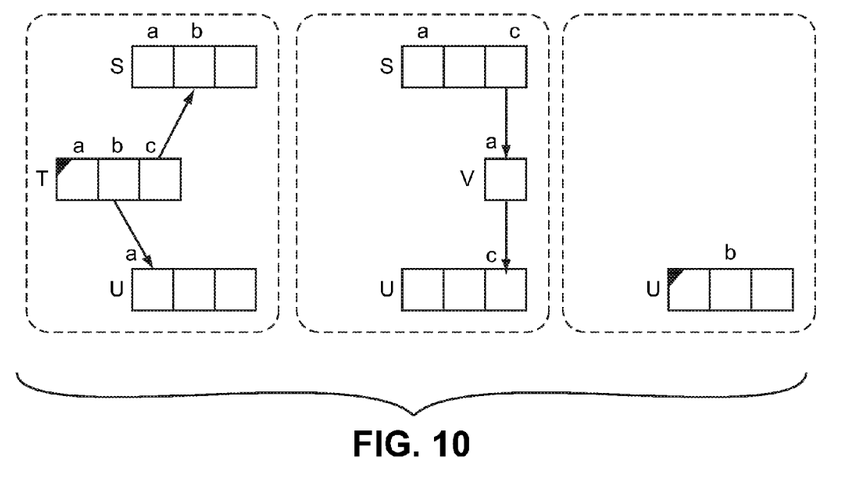
FIG. 10 shows an example diagram of a cache group federation.

It should be noted that the inferred cache group federation can be the design of (here three) cache groups. Thus, the scheme described can be used in environments that do not support the federation of cache groups. As already discussed, the query pattern is also covered through the separate storage of the generated groups. The three cache groups belonging to the federation built in FIG. 9d are shown in FIG. 10.

It will be appreciated that if queries with the same predicate pattern occur often enough, a new federation will be created using the query-centric approach. There are several ways to decide when the same predicate pattern occurs often enough. One straightforward approach may be based on frequency, referred to as current query pattern frequency. If a given frequency is exceeded (e.g., high frequency), the federation is created (if possible). If the current query pattern frequency falls below a corresponding low frequency, the federation and its contents are removed. Typically, a logical time is used to calculate frequencies instead of minutes or seconds.

As generally described above, the system follows general design rules for creating the cache groups. In particular, the system creates cache group federations that support complete queries and does not further federate federations created for different queries (and thus keeps them separated). The system also employs the general rule that a value-based predicate in a predicate pattern is mapped to an FC and an equi-join predicate in a predicate pattern is mapped to an RCC.

FIG. 11 shows the implementation of the system using a pseudo-code design. Of course, the system can be implemented in many different ways and is not limited to the processes shown in FIG. 11.

Figure 12:
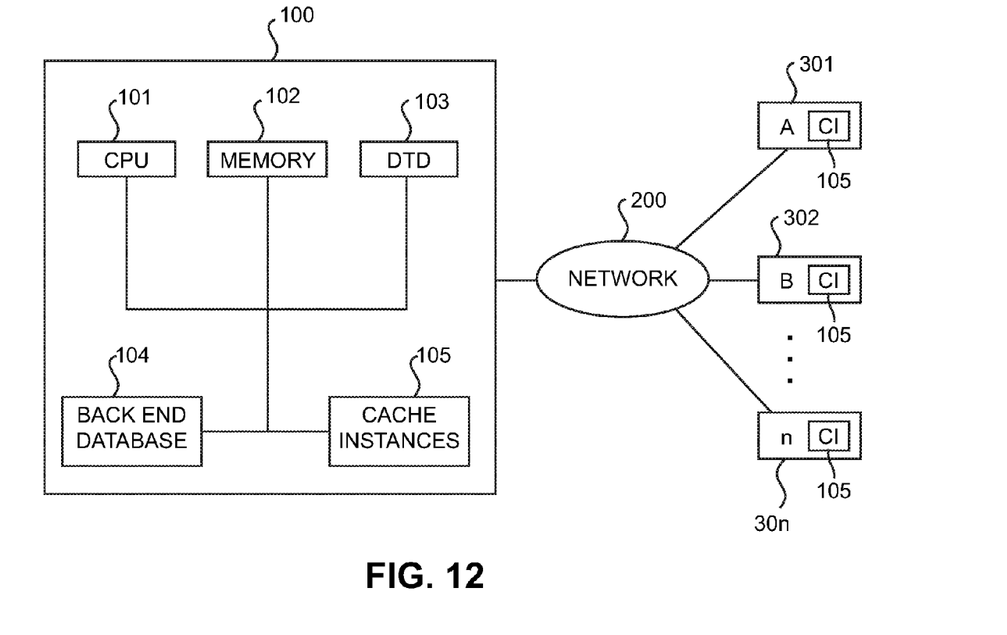
FIG. 12 depicts an example block diagram of an embodiment of the database system.

FIG. 12 shows a block diagram of an example embodiment of present technology. Although not limited to this example embodiment, the system can comprise a database system 100 that communicates with terminals 301-30n over a network 200. The terminals 301-30n can be, for example, personal computers, servers, cell phones, or any electronic device capable of conveying information.

The database system 100 can be equipped with a CPU 101, a memory 102, a data transmission device 103, a back end database 104, and cache instances 105. It will be appreciated that the data transmission device 103 can be, for example, a network interface device that can connect the system 100 to the network 200. It also will be appreciated that the data transmission device 103 is capable of sending and receiving data (and thus may be considered a transceiver).

The back end database 104 is a database used for storing a plurality of data, and the cache instances 105 are designed (e.g., as described above) to create various cache groups for the associated data. For instance, as discussed above, the cache instances 105 allow the information from the back end database 104 to be accessed much more quickly, thereby improving the latency of the system.

It will be appreciated that the database system 100 can be implemented as a single system or distributed across multiple nodes (e.g., separate computer systems having multiple databases and/or cache instances). It also will be appreciated that the cache instances 105 can exist apart from the database system 100 in a separate system and/or can even be included in terminals 301-30n in certain example embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for automatic and dynamic adaptation of cache groups in a database system having one or more processors, the method comprising:
creating an anchored table set configured to hold one or more cache tables;
collecting value-based predicates in a database query;
creating a cache table for each value-based predicate and marking a filling column in each respective cache table;
adding each cache table to the anchored table set;
determining addable referential cache constraints between each cache table in the anchored table set;
determining costs for each addable referential cache constraint;
adding the referential cache constraint based on the determined cost of the respective referential cache constraint;
checking the cache tables in the anchored table set for heterogeneous cycles between tables; and
modifying referential cache constraints between cache tables when a heterogeneous cycle exists between cache tables, wherein
the determining of addable referential cache constraints, the determining of costs for each addable referential cache constraint, the adding of the referential cache constraint, the checking of the cache tables in the anchored table set, and the modifying of the referential cache constraints is repeated until all possible addable referential cache constraints have been exhausted, and
cache groups can be federated when the cache groups belong to a same predicate pattern and the cache groups can be prohibited from further federation when the cache groups belong to a different predicate pattern.

2. The method of claim 1, further comprising determining a referential cache constraint having a minimal cost amongst each addable referential cache constraint.

3. The method of claim 2, further comprising calculating a cost for a reverse of each addable referential cache constraint.

4. The method of claim 3, further comprising calculating a switching cost for each addable referential cache constraint and its corresponding cost for the reverse of each addable referential cache constraint by subtracting the cost of each addable referential cache constraint from its corresponding cost for the reverse of each addable referential cache constraint.

5. The method of claim 4, wherein the switching cost for each addable referential cache constraint is added to a priority list where the smaller switching costs have higher priority.

6. A non-transitory computer-readable storage medium having computer readable code embodied therein and capable of being stored in a memory as computer program instructions that, when executed by a computer having one or more processors, causes the computer to at least perform:
creating an anchored table set configured to hold one or more cache tables;
collecting value-based predicates in a database query;
creating a cache table for each value-based predicate and marking a filling column in each respective cache table;
adding each cache table to the anchored table set;
determining addable referential cache constraints between each cache table in the anchored table set;
determining costs for each addable referential cache constraint;
adding the referential cache constraint based on the determined cost of the respective referential cache constraint;
checking the cache tables in the anchored table set for heterogeneous cycles between tables; and
modifying referential cache constraints between cache tables when a heterogeneous cycle exists between cache tables, wherein
the determining of addable referential cache constraints, the determining of costs for each addable referential cache constraint, the adding of the referential cache constraint, the checking of the cache tables in the anchored table set, and the modifying of the referential cache constraints is repeated until all possible addable referential cache constraints have been exhausted, and
cache groups can be federated when the cache groups belong to a same predicate pattern and the cache groups can be prohibited from further federation when the cache groups belong to a different predicate pattern.

7. The non-transitory computer readable storage medium of claim 6, further comprising determining a referential cache constraint having a minimal cost amongst each addable referential cache constraint.

8. The non-transitory computer readable storage medium of claim 7, further comprising calculating a cost for a reverse of each addable referential cache constraint.

9. The non-transitory computer readable storage medium of claim 8, further comprising calculating a switching cost for each addable referential cache constraint and its corresponding cost for the reverse of each addable referential cache constraint by subtracting the cost of each addable referential cache constraint from its corresponding cost for the reverse of each addable referential cache constraint.

10. The non-transitory computer readable storage medium of claim 9, wherein the switching cost for each addable referential cache constraint is added to a priority list where the smaller switching costs have higher priority.

11. A database system, comprising:
a backend database having a memory and one or more processors and storing backend data; and
one or more cache instances having a memory and one or more processors and operatively communicating with the backend database, the one or more processors being configured to:
create an anchored table set configured to hold one or more cache tables;
collect value-based predicates in a database query;
create a cache table for each value-based predicate and marking a filling column in each respective cache table;
add each cache table to the anchored table set;
determine addable referential cache constraints between each cache table in the anchored table set;
determine costs for each addable referential cache constraint;
add the referential cache constraint based on the determined cost of the respective referential cache constraint;
check the cache tables in the anchored table set for heterogeneous cycles between tables; and
modify referential cache constraints between cache tables when a heterogeneous cycle exists between cache tables, wherein
the determining of addable referential cache constraints, the determining of costs for each addable referential cache constraint, the adding of the referential cache constraint, the checking of the cache tables in the anchored table set, and the modifying of the referential cache constraints is repeated until all possible addable referential cache constraints have been exhausted, and
cache groups can be federated when the cache groups belong to a same predicate pattern and the cache groups can be prohibited from further federation when the cache groups belong to a different predicate pattern.

12. The database system of claim 11, wherein the one or more processors in the one or more cache instances are further configured to determine a referential cache constraint having a minimal cost amongst each addable referential cache constraint.

13. The database system of claim 12, wherein the one or more processors in the one or more cache instances are further configured to calculate a cost for a reverse of each addable referential cache constraint.

14. The database system of claim 13, wherein the one or more processors in the one or more cache instances are further configured to calculate a switching cost for each addable referential cache constraint and its corresponding cost for the reverse of each addable referential cache constraint by subtracting the cost of each addable referential cache constraint from its corresponding cost for the reverse of each addable referential cache constraint.

15. The database system of claim 14, wherein the switching cost for each addable referential cache constraint is added to a priority list where the smaller switching costs have higher priority.

* * * * *